(12) United States Patent
Paolucci

(10) Patent No.: US 9,285,076 B2
(45) Date of Patent: Mar. 15, 2016

(54) ANCHOR DEVICE

(71) Applicant: Frederick Joseph Paolucci, North Providence, RI (US)

(72) Inventor: Frederick Joseph Paolucci, North Providence, RI (US)

( * ) Notice: Subject to any disclaimer, the term of this patent is extended or adjusted under 35 U.S.C. 154(b) by 0 days.

(21) Appl. No.: 14/868,573

(22) Filed: Sep. 29, 2015

(65) Prior Publication Data

US 2016/0018056 A1 Jan. 21, 2016

Related U.S. Application Data

(63) Continuation-in-part of application No. 13/987,562, filed on Dec. 21, 2010, now abandoned.

(51) Int. Cl.
*E04H 12/22* (2006.01)
*F16M 13/06* (2006.01)
*E04H 15/28* (2006.01)
*E04H 15/62* (2006.01)
*A45B 23/00* (2006.01)

(52) U.S. Cl.
CPC ............ *F16M 13/06* (2013.01); *E04H 12/2215* (2013.01); *E04H 15/28* (2013.01); *E04H 15/62* (2013.01); *A45B 2023/0012* (2013.01)

(58) Field of Classification Search
CPC .......... E04H 12/2215; A45B 3/00; A45F 3/44
USPC ........................................................ 248/530
See application file for complete search history.

(56) References Cited

U.S. PATENT DOCUMENTS

| 4,700,420 | A | * | 10/1987 | Belanger | B25F 1/02 182/100 |
| 5,105,493 | A | * | 4/1992 | Lugtenaar | A01D 11/00 15/141.1 |
| 5,482,071 | A | * | 1/1996 | Liu | A45B 3/00 135/66 |
| 5,524,855 | A | | 6/1996 | Lesar | |
| D371,901 | S | | 7/1996 | Perls | |
| 5,535,978 | A | | 7/1996 | Rodriguez et al. | |
| 6,328,046 | B2 | | 12/2001 | Doreste | |
| 6,354,554 | B1 | | 3/2002 | Hollenbeck | |
| 6,471,176 | B2 | | 10/2002 | Berthiaume | |
| 6,715,503 | B2 | | 4/2004 | Brooks, III | |
| 7,219,382 | B2 | * | 5/2007 | Johnson | A01B 1/022 7/116 |
| 7,406,975 | B1 | | 8/2008 | Carrier, Jr. | |
| D606,776 | S | | 12/2009 | Zubyk | |
| D652,615 | S | | 1/2012 | Paolucci | |
| 2007/0204891 | A1 | | 9/2007 | Zubyk | |
| 2009/0020145 | A1 | | 1/2009 | Zubyk | |
| 2012/0042915 | A1 | | 2/2012 | Dorr | |
| 2013/0037066 | A1 | | 2/2013 | Dorr | |

* cited by examiner

*Primary Examiner* — Bradley Duckworth
(74) *Attorney, Agent, or Firm* — Barlow, Josephs & Holmes, Ltd.

(57) ABSTRACT

The anchor device includes a post movably connected to a base and is lockable in shovel, anchor and storage positions. First, it is locked in a shovel position and a hole is dug in beach sand. The anchor device is then disengaged from the shovel position and then locked into an anchor position and then inserted into the hole and then covered with beach sand to secure the post portion of the anchor device in a vertical position with a portion of the post exposed above the surface of the sand. A beach umbrella is inserted into and secured to the post. To remove the anchor device from the sand, the anchor lock position is disengaged from above the sand to permit the post and the base to freely pivot relative to each other so the base and post can be easily pulled from the sand.

8 Claims, 17 Drawing Sheets

ANCHOR DEVICE

CROSS REFERENCE TO RELATED APPLICATION

This application is a continuation-in-part of and claims priority from earlier filed U.S. Ser. No. 13/987,562, filed Dec. 21, 2010, the entire contents thereof is incorporated herein by reference.

BACKGROUND OF THE INVENTION

The present invention relates to anchor devices for supporting and securing objects, such as umbrellas. More specifically, the present invention relates to securing such objects into sand, such as that found at the beach and other locations.

It is very well known in the art to secure objects into sand so that they may be secured in place. For example, it is very common in the art to secure an umbrella in sand by including a pointed stake on the free end of the umbrella post and then driving that pointed end into the sand as much as possible. However, a pointed end is susceptible to being pulled out easily, particularly when there are strong winds that can pull up on the umbrella to remove it from the sand It is also very well known to provide weights on a base of an umbrella to hold it in place. This solution suffers from the drawback of being heavy and difficult to transport and is still susceptible to being tipped over.

Still further, there are known anchor systems that help secure an umbrella in unstable ground, such as sand. However, they are installed first and then buried in sand and are devoid of a way to easy remove the anchor device, thereby requiring the anchor device to be dug out so it can be removed. This requires labor on the part of the user to simply remove the anchor device when it is no longer needed and needs to be transported.

The above attempts in the prior art fail to solve the above mentioned problems.

In view of the foregoing, there is a demand for an anchor device that is lightweight yet easy to use yet still effectively anchors an umbrella in sand, even in the presence of strong winds. There is also a demand for an anchor device that can be easily removed from the sand without first being dug up by the user.

SUMMARY OF THE INVENTION

The present invention preserves the advantages of prior art anchor device and, particularly, anchor devices for beach umbrellas. In addition, it provides new advantages not found in currently available devices and overcomes many disadvantages of such currently available devices.

The present invention is directed to a new and novel anchor device for supporting and anchoring an umbrella and improved method of securing a beach umbrella using the anchor device of the present invention. The anchor device includes a post movably connected to a base that is lockable in a shovel, anchor or storage position.

First, to install the anchor device, it is first locked in a shovel position and a hole is dug in beach sand using the device as a shovel. The anchor device is then locked into an anchor position and then inserted into the hole and then covered with beach sand to secure the post portion of the anchor device in a vertical position. A beach umbrella, namely its pole, in inserted into and secured to the post of the device of the present invention. To remove the anchor device from the sand, the anchor lock position is disengaged from above the surface of the sand and the post and base connected thereto are pulled from the sand.

The present invention provides an anchor device for supporting an umbrella in sand that includes a post member having a bottom edge and a top edge. A base member (blade portion) has an outer edge and a top surface. A bracket member is affixed to the base member proximal to an outer edge. The bracket member includes a first edge substantially parallel to the top surface and a second edge on one side that is substantially perpendicular to the top surface of the base member. A third edge of the bracket is provided that is also substantially perpendicular to the top surface of the base member. The post member is pivotally connected to the bracket where the base member and the post member are movable between a locked shovel position, with the bottom edge of the post in secured communication with the second edge, and a locked anchor position with the bottom edge of the post in secured communication with the first edge. The base member is fully buriable and the post member is partially buriable in sand when in the locked anchor position. When buried in the sand in a locked anchor position, from above the surface of the sand, the bottom edge of the post member is easily unlocked/disengaged from the first edge of the bracket to permit free rotation of the post relative to the bracket to facilitate pulling of the entire anchor device from sand without first digging it out from the sand.

Therefore, an object of the invention is to provide an anchor device that is lightweight yet easy to use yet still effectively anchors an umbrella in sand, even with strong winds.

Another object of the invention is to provide an anchor device that can be easily removed from the sand without first being fully dug up by the user.

Yet another object of the present invention is to provide an anchor device that can be quickly and easily locked and unlocked to secure the device in a shovel, anchor and storage positions.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Figure 1:
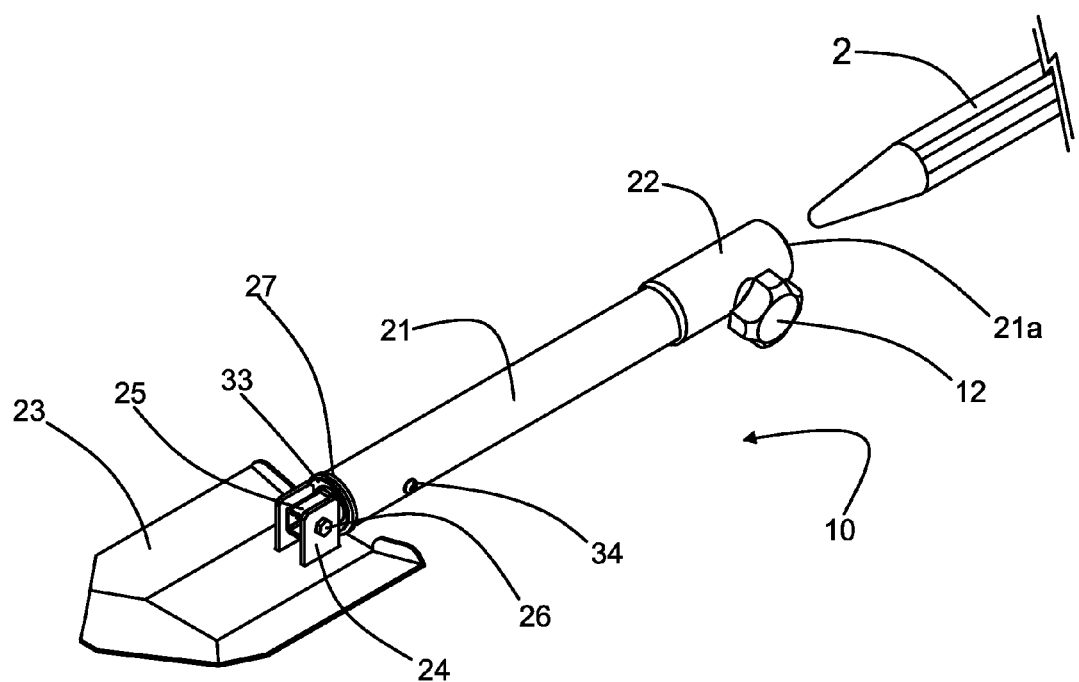
FIG. 1 is a front perspective view of the anchor device of the present invention.

Turning first to FIG. 1, a front perspective view of the anchor device 10 of the present invention is shown to include a base 23 that is pivotally connected to a preferably tubular post 21 via bracket 24. The base 23 serves as a blade when the anchor device 10 is in a shovel position, as will be described below. An umbrella, the pole 2 of which is shown only, is insertable into a top open end 21a of the post 21 and secured in place by handle assembly 22 and a set screw 12. As will be shown in detail below, a turnbuckle 25 is employed as an interim member between the post 21 and bracket 24 to enable easily releasably locking of the post 21 to the base 23.

Figure 2:
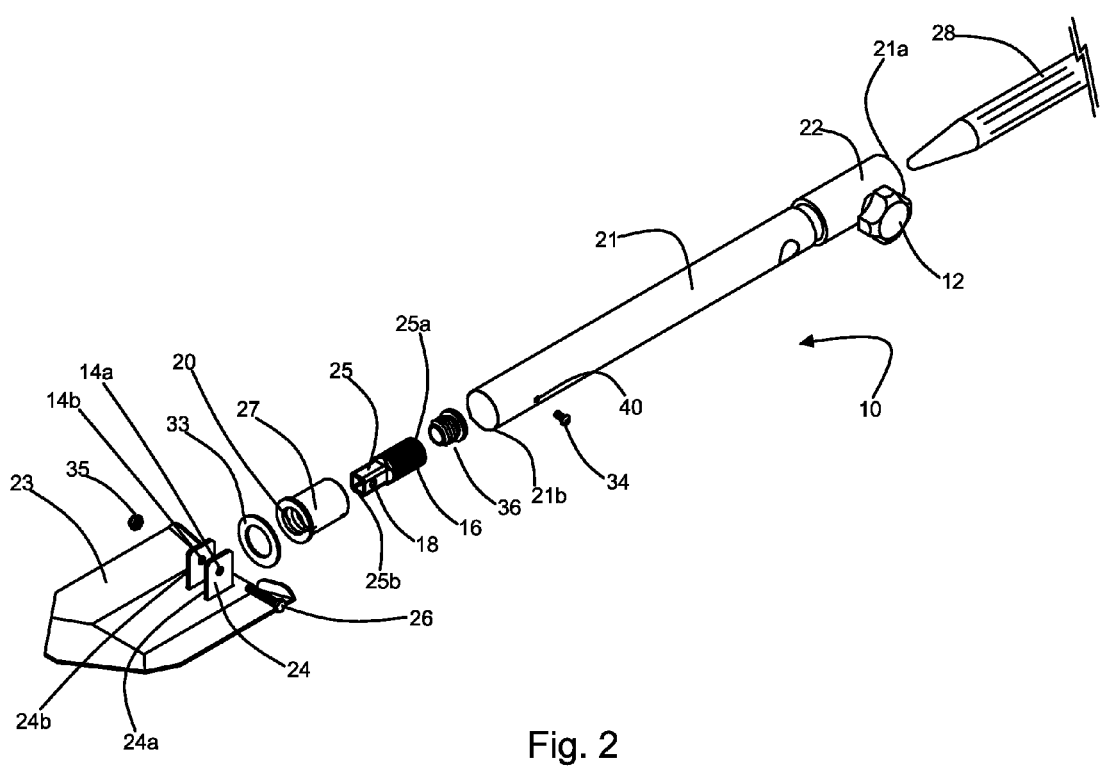
FIG. 2 is an exploded front perspective view of the anchor device of FIG. 1.

FIG. 2 shows exploded front perspective view of the anchor device 10 of FIG. 1 where all of the parts and components are shown. The bracket 24 includes a pair of upstanding walls 24a and 24b with pass through apertures 14a and 14b configured for receipt of a screw 26 and nut 25, as shown, to serve as a locking pin assembly. Turnbuckle 25 includes a top end 25a that has male threading thereon 16 and a bottom end 25b that includes a transverse aperture or pair of apertures 18. A tubular insert 27, with threading 20 on the interior surface thereof, is secured into the bottom open end 21b of the post 21 and secured in place by a screw 34 and aperture 40 in the post 21. As a result, the bottom open end 21b of the post 21 is equipped with a female threaded aperture by the threads 20 of insert 27 for receipt of the male threaded portion 16 of the turnbuckle 25. A sand plug 36 is also secured to the top end of the turnbuckle 25 to prevent flow of beach sand through the turnbuckle 25.

Figure 3:
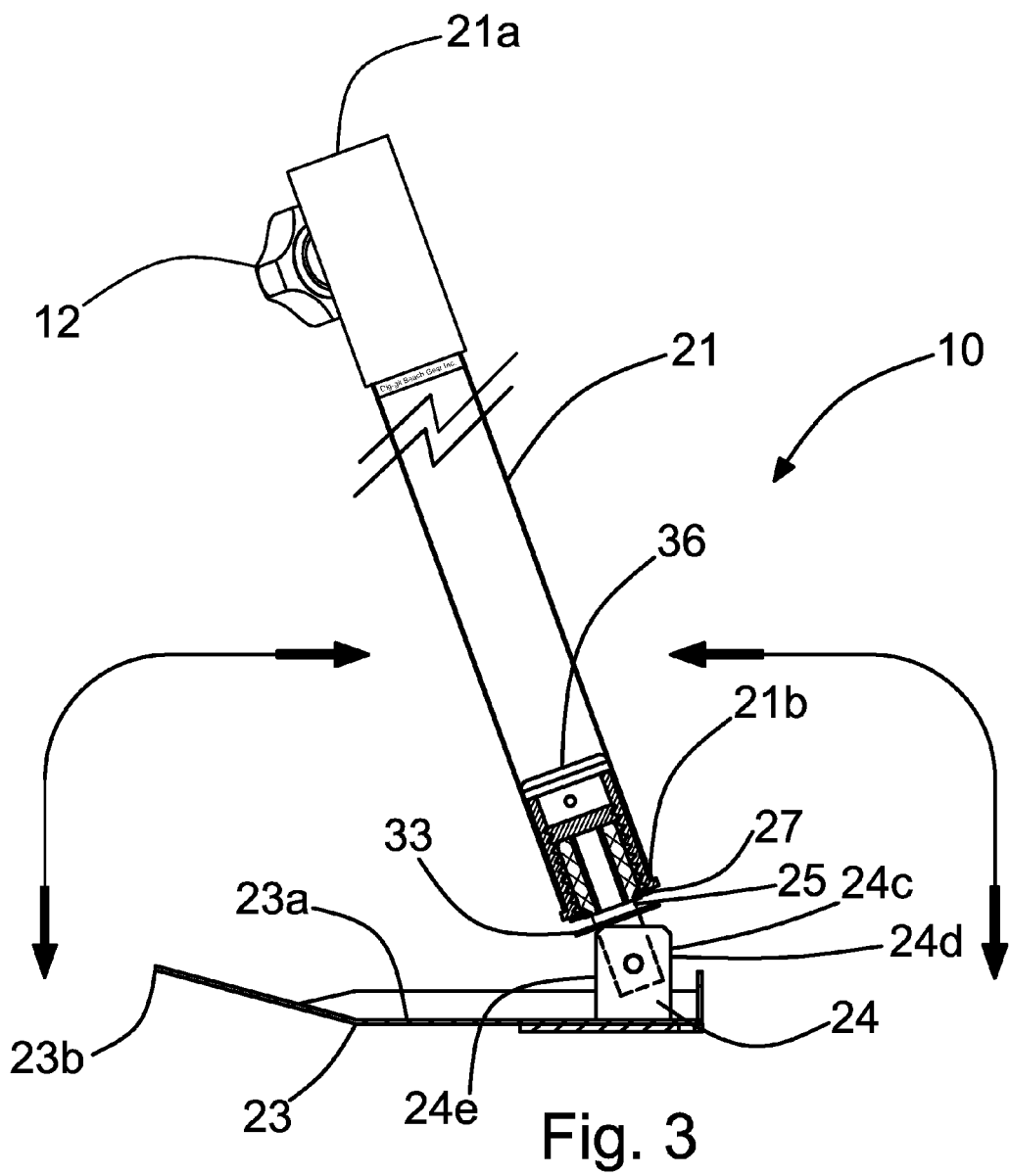
FIG. 3 is a partial cross-sectional view of the anchor device of FIG. 1 illustrating the pivoting capability.

Also, the male threading 16 on the turnbuckle 25 and the female threading 20 on the tubular insert 27 connected to the bottom open end 21b of the post 21 can be configured with a stop mechanism to control the extent of the threaded rotation of the post 21 and tubular insert 27 relative to the male threaded end 16 of the turnbuckle 25 (not shown). This will avoid separation of the post 21 from the turnbuckle 25. Therefore, the post 21 is threadably connected to the turnbuckle 25, which is in turn pivotally connected to the base 23, via bracket 24. As can be seen in FIG. 3, the post 21 is shown fully rotated in a counterclockwise direction so that the bottom edge 21b of the post 21 (and tubular insert 27) is lifted off of the first edge 24c of the bracket 24, which is substantially parallel to the top surface 23a of the base 23. The washer 33 can be seen loosely routed about the neck of the turnbuckle 25.

In the position shown in FIG. 3, the bottom edge 21b of the post 2 (and tubular insert 27), collectively referred to a bottom edge 21b of post 21, is separated from the first edge 24c of the bracket 24, in fact two edges of upstanding walls 24a and 24b, enough to permit free rotation of the post 21 relative to the bracket 24 and base 23 attached thereto. In this loose position, the user is free to select the position of the post 21 depending on the desired function required.

Figure 4:
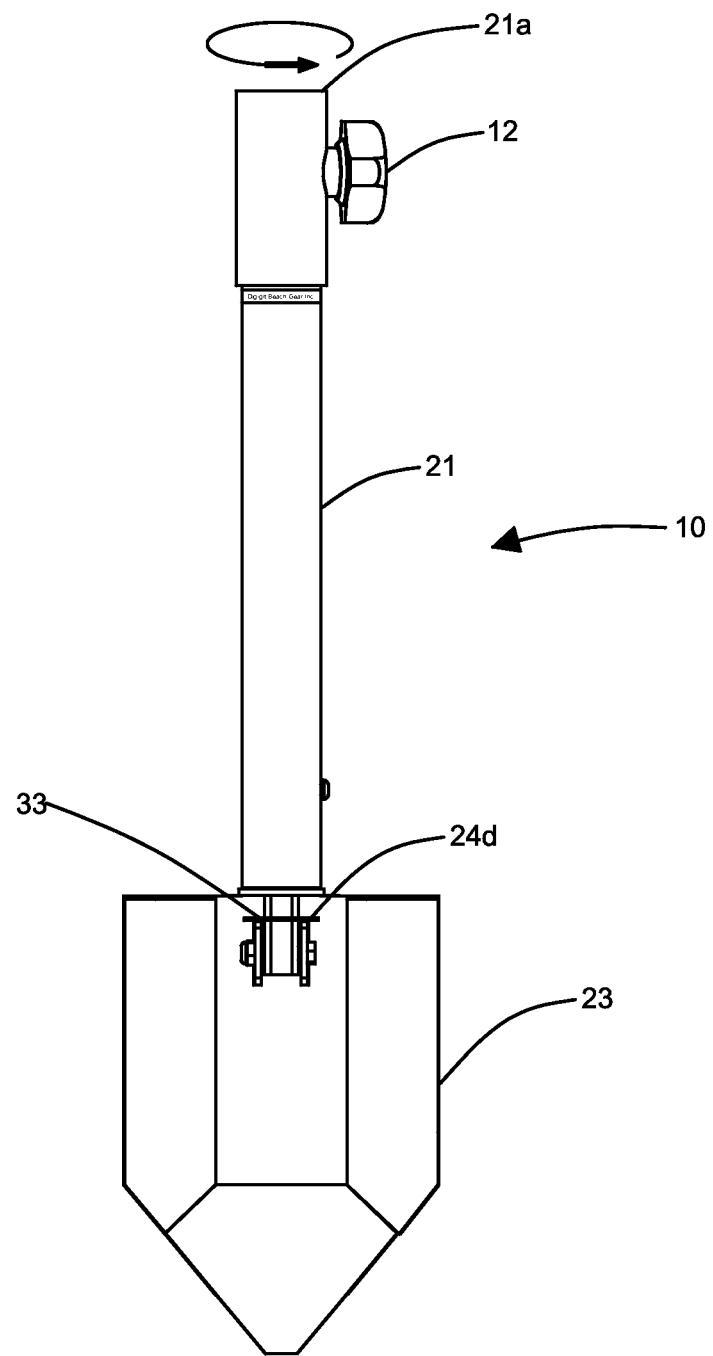
FIG. 4 is a top view of the anchor device of FIG. 1 in a shovel position with the base loosely connected to the post.
Figure 5:
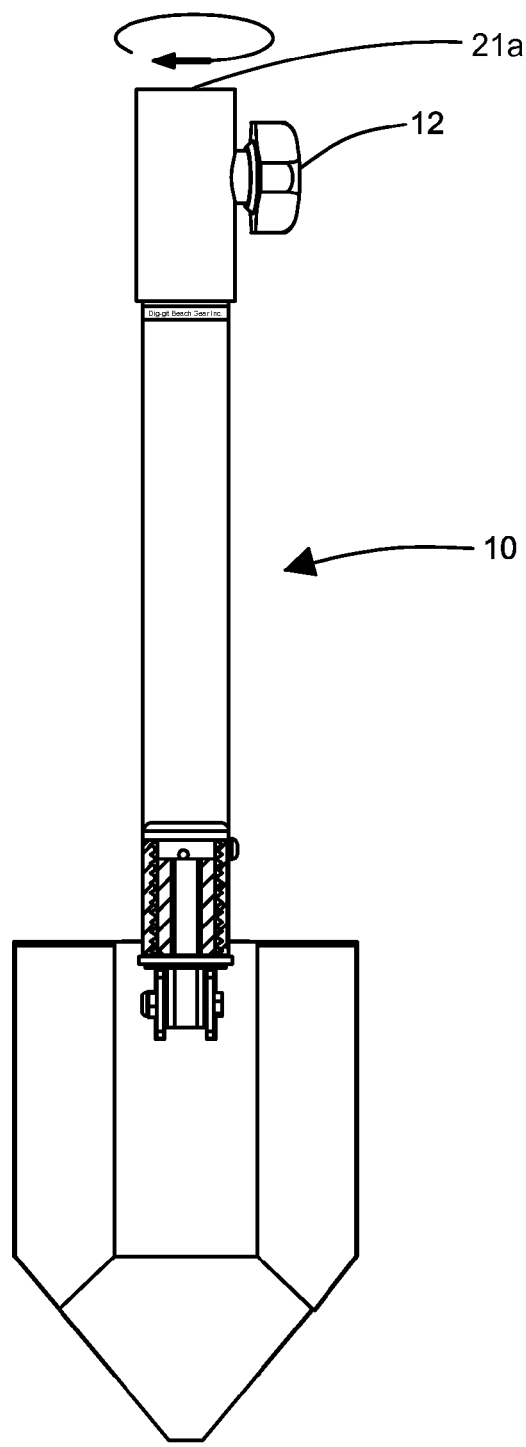
FIG. 5 is a top view of the anchor device of FIG. 1 in a shovel position with the base tightly connected to the base ready for digging.
Figure 12:
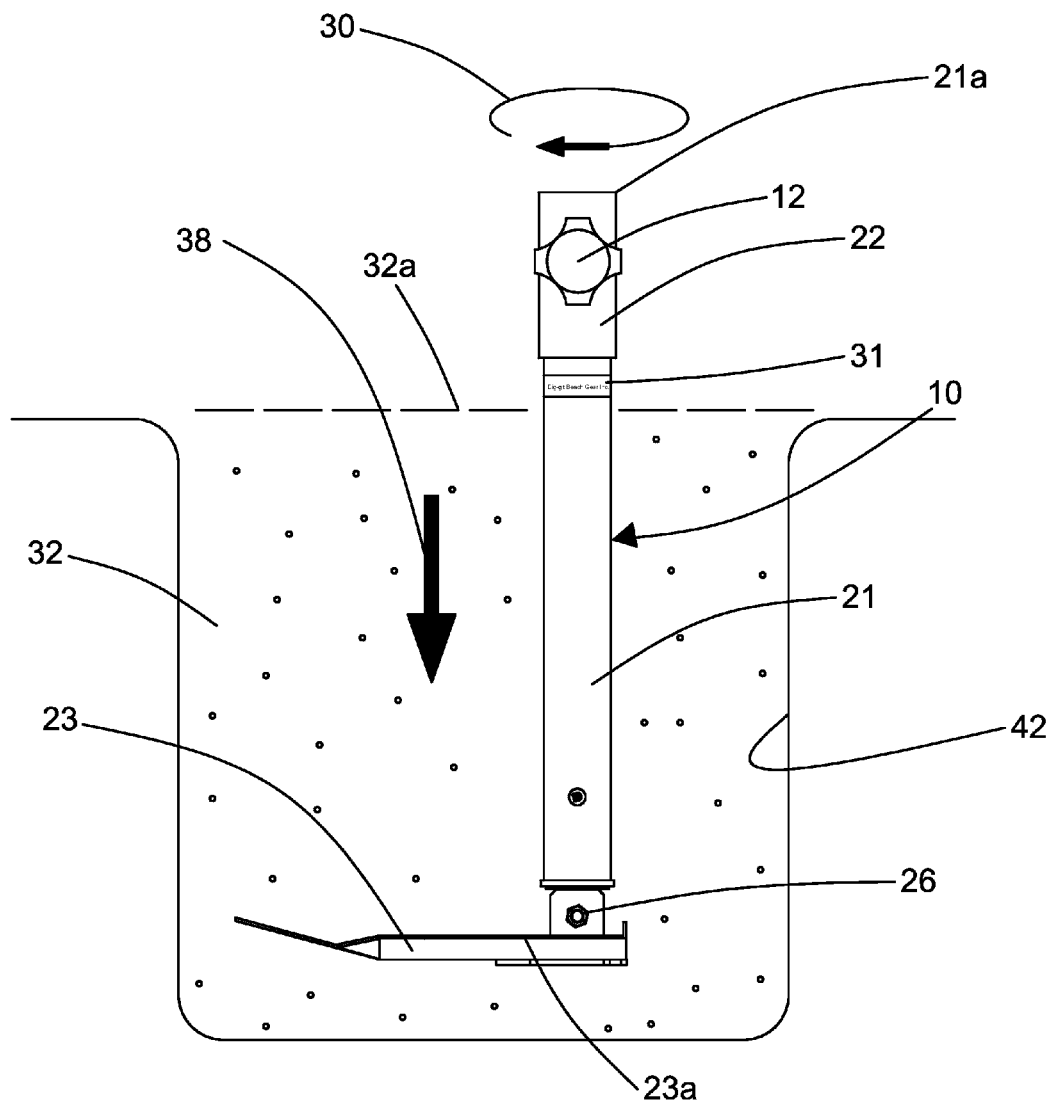
FIG. 12 is a partial side cross-sectional view of the anchor device of FIG. 8 inserted into a hole and then filled with sand to bury the anchor device.

For example, FIG. 4 shows a top view of the anchor device 10 where the bottom edge 21b of the post 21 is aligned with a second edge 24d (actually two edges of the upstanding walls 24a and 24b) that is substantially perpendicular to the top surface 23a of the base 23. This second edge 24d is a vertical edge of the bracket 24 that is opposite to the digging edge 23b of the base 23. In FIG. 5, clockwise rotation of the post 21 is effectuated so the bottom edge 21b of the post 21 is drawn to the second edge 24d of the bracket 24. Further hand rotation of the post 21 causes the bottom edge 21b of the post 21 to be secured to the second edge 24d of the bracket 24 with a clamping action thereby preventing rotation of the post 21. With the anchor device 10 in this shovel position, the base 23 is secured in substantial alignment with the post 21 to provide a shovel position. The anchor device 10, in this the shovel position, is used to dig the desired hole 42 in the sand, as seen in FIG. 12, to receive an umbrella anchored by the anchor device 10 of the present invention. Preferably, for example, a 12-inch circular hole 42 with an approximate 12-inch depth, as in FIG. 12, is dug removing the beach sand 32 and setting it aside.

Figure 6:
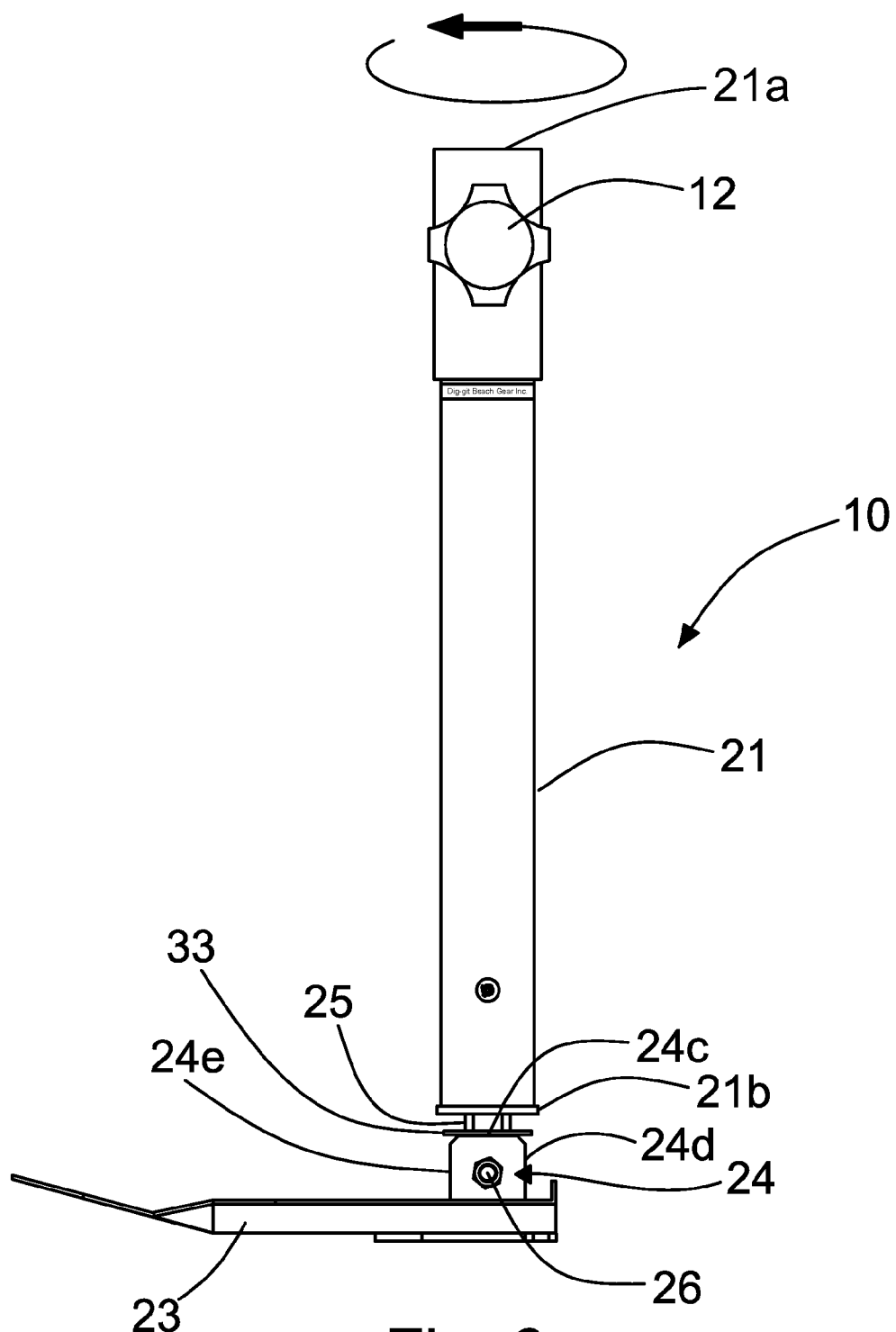
FIG. 6 is a side view of the anchor device of FIG. 1 in an anchor position with the base loosely connected to the post.
Figure 7:
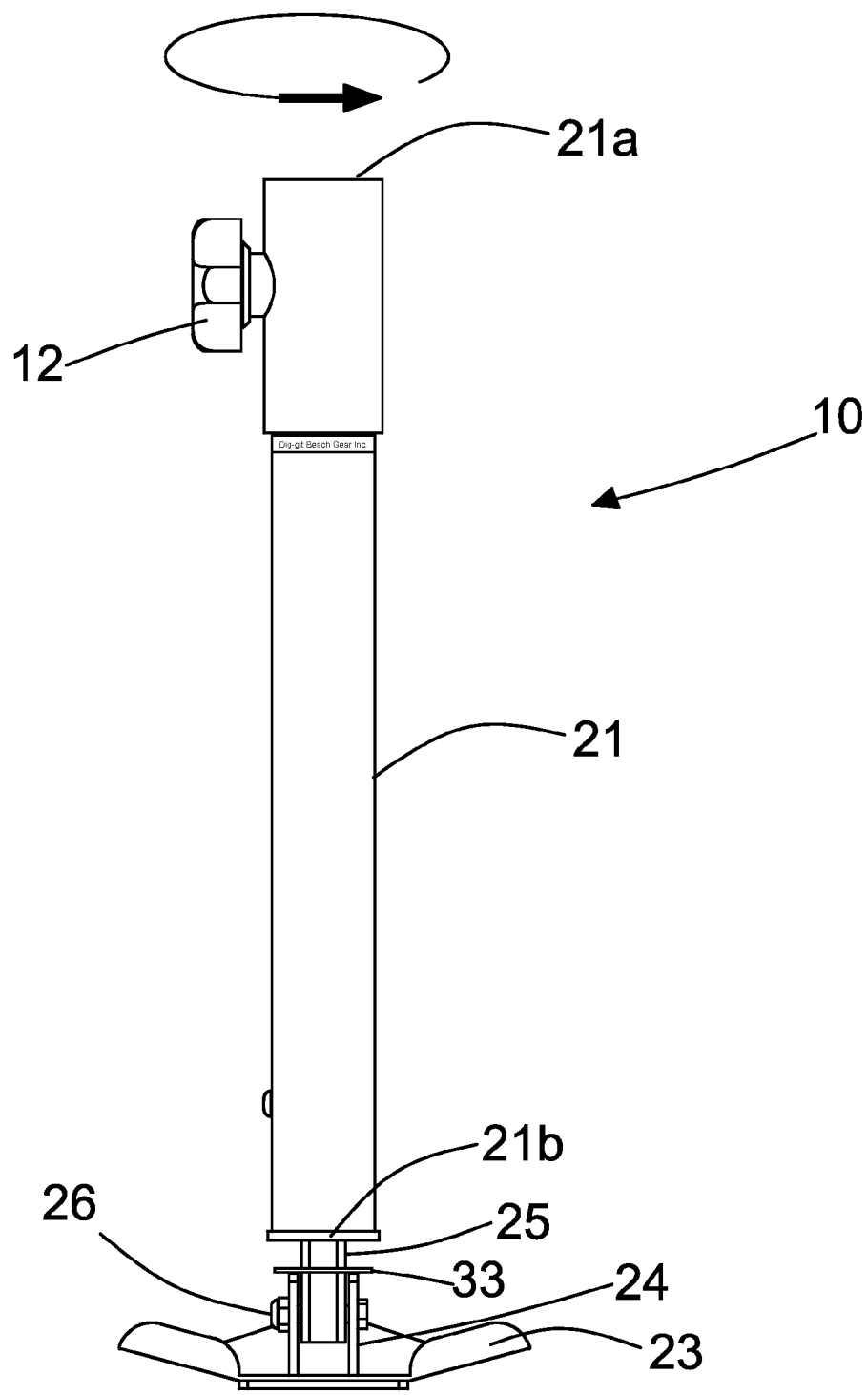
FIG. 7 is an end view of the anchor device of FIG. 6.

Once the anchor device 10 is finished being used as a shovel to dig the desired hole 42 in the sand 32, the anchor device 10 is reconfigured as an anchor structure for later receipt of a pole 2 of an umbrella. Turning to FIGS. 6 and 7, the post 21 is shown in a loosened position with the post 21 rotated counterclockwise to lift the bottom edge 21b of the post 21 out of engagement with the bracket 24 so the post 21 can freely rotate relative to the bracket 24 and base 23. With the post 21 disengaged from the bracket 24, the post 21 is pivoted about pin 26 to a location with the bottom edge 21b of the post 21 aligned with the first edge 24c of the bracket, which is substantially and preferably parallel with the top surface 23a of the base 23. The washer 33 is loosely routed about the neck of the turnbuckle 25.

Figure 8:
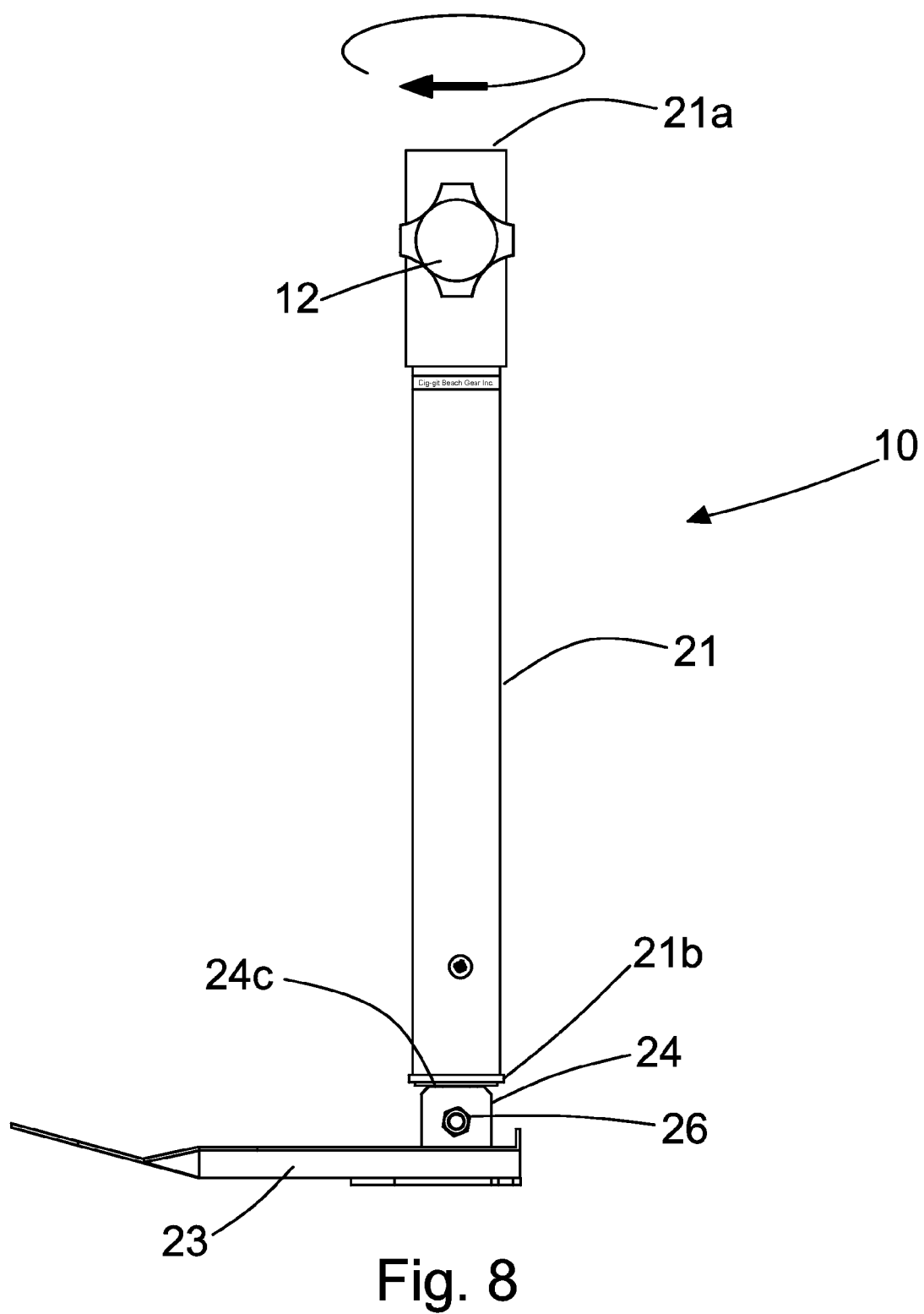
FIG. 8 is a side view of the anchor device of FIG. 1 in an anchor position with the base tightly connected to the post ready for anchoring into sand.
Figure 9:
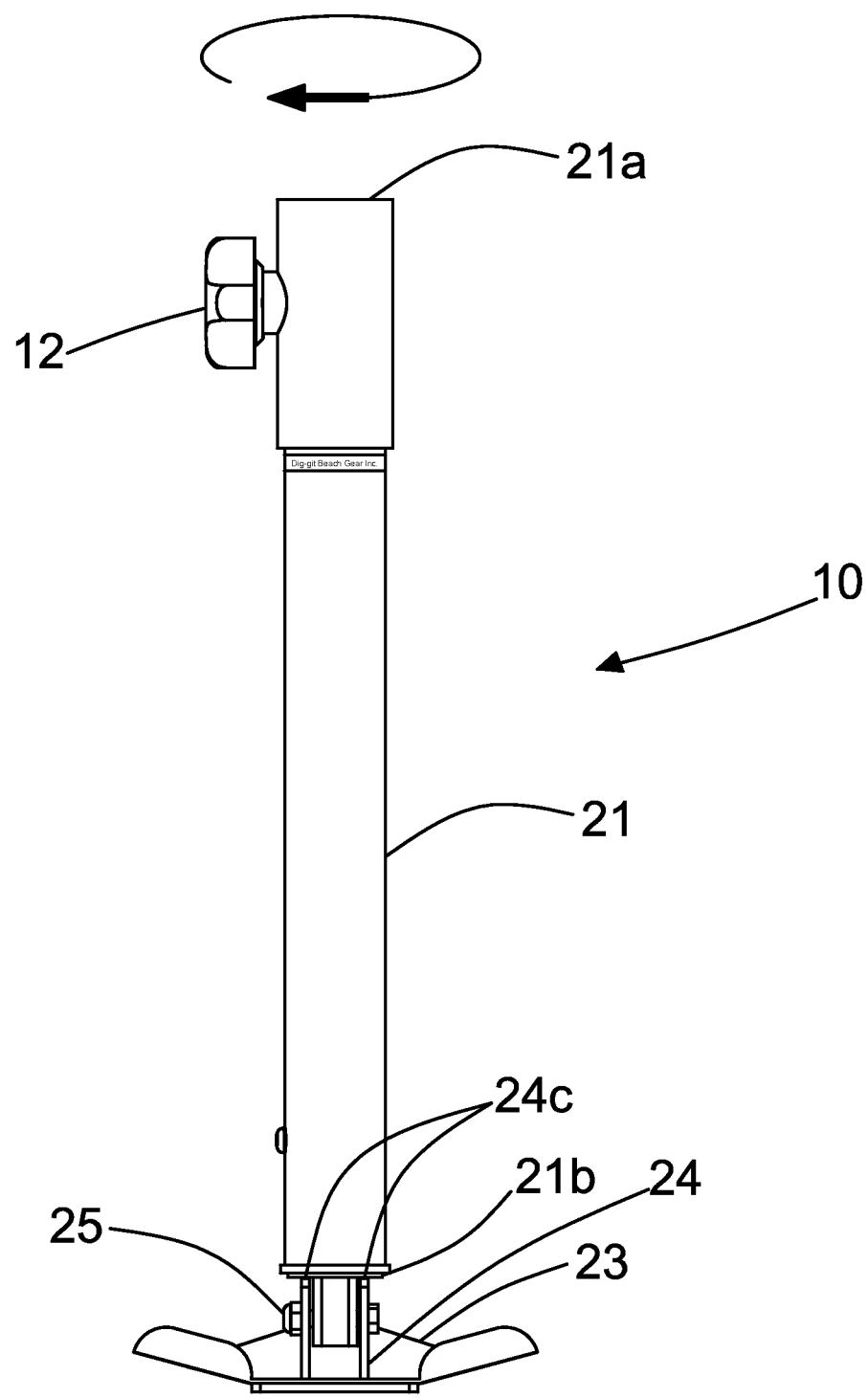
FIG. 9 is an end view of the anchor device of FIG. 8.
Figure 10:
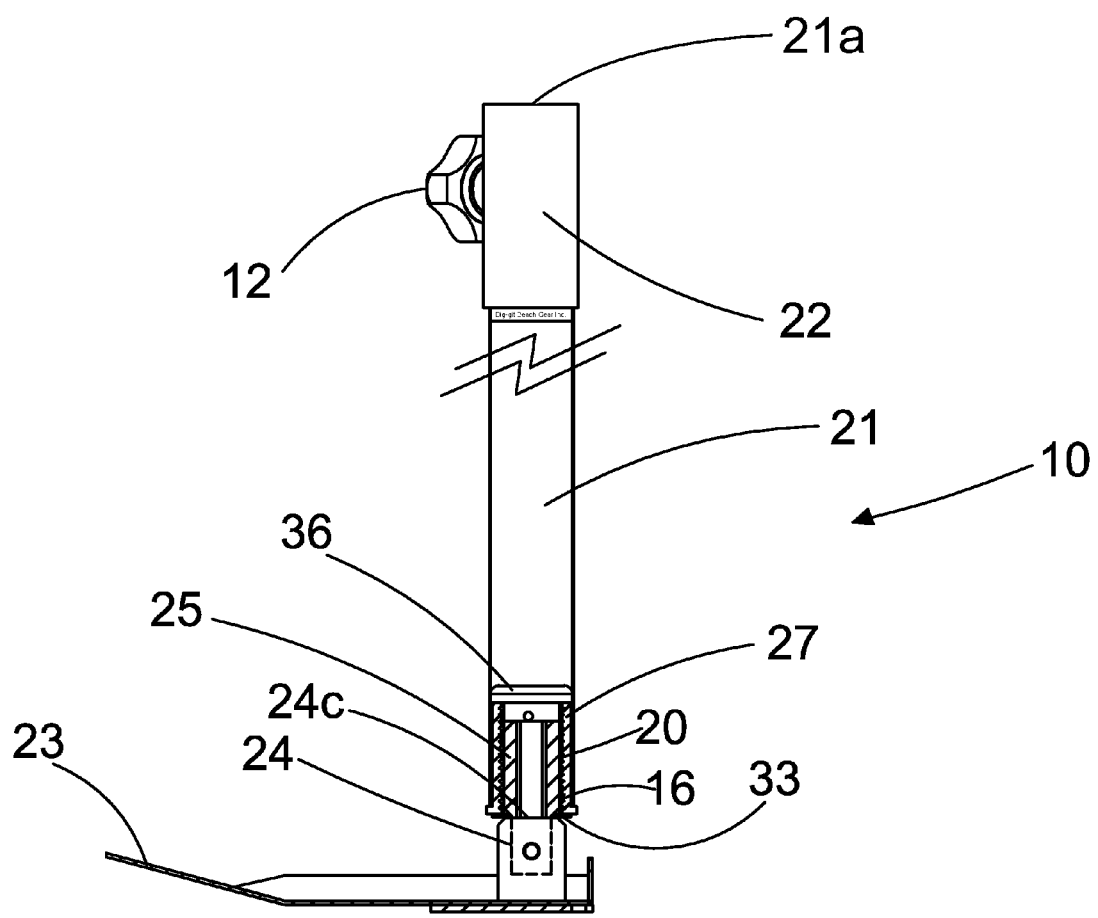
FIG. 10 is a partial cross-sectional view of the anchor device of FIG. 8.
Figure 11:
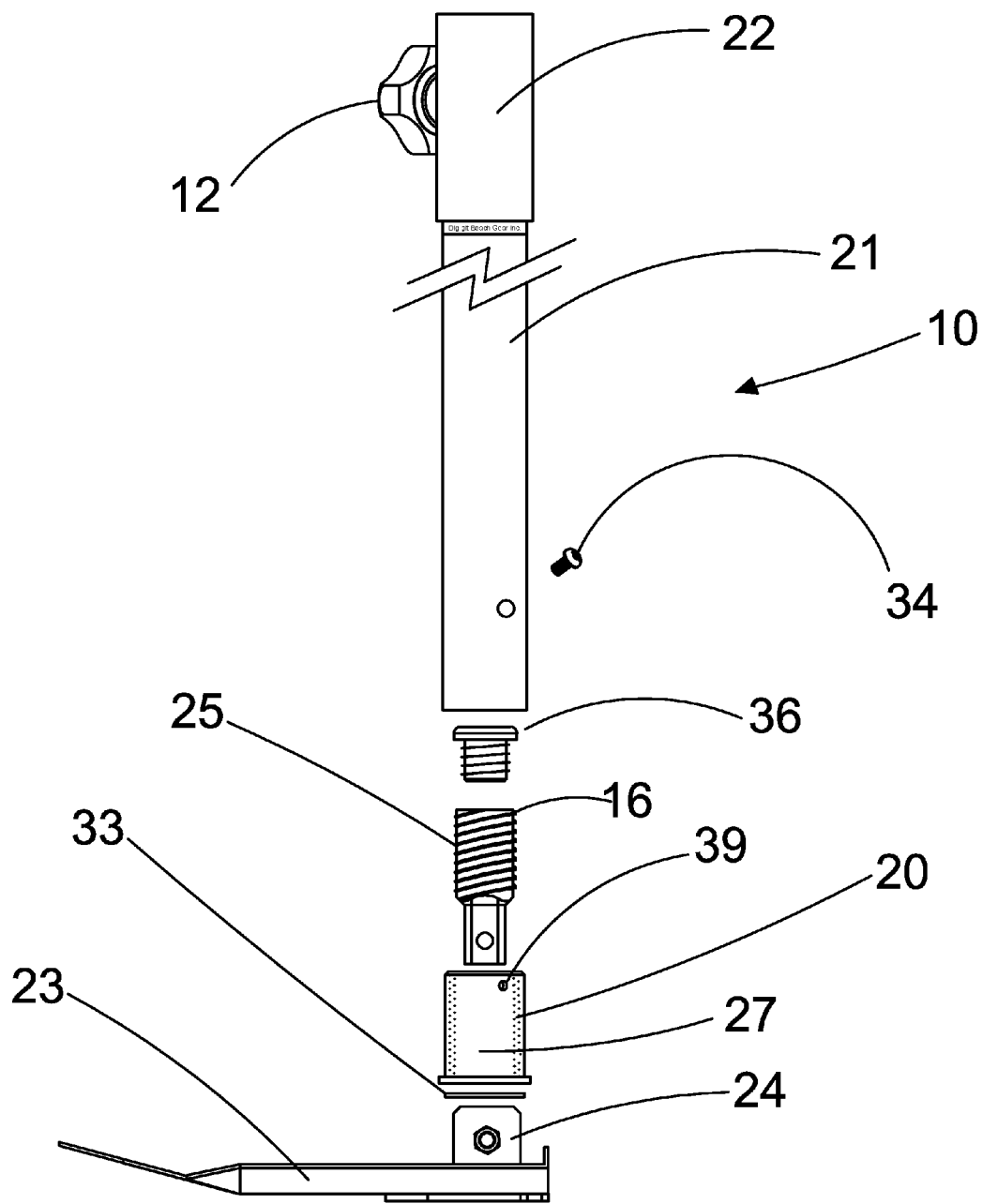
FIG. 11 is a side exploded view of the anchor device of FIG. 8.

Counterclockwise rotation of the post 21 relative to the bracket 24 and base 23 causes the bottom edge 21b of the post 21 to be drawn toward the first edge 24c of the bracket. Further threaded tightening down of the post 21 to the bracket 24 secures the post 21 to the bracket 24 and prevents rotation thereof. However, in FIGS. 8 and 9, the bottom edge 21b of the post 21 is secured against the first edge 24c of the bracket 24 thereby securing the base 23 to the post 21 at a substantial 90-degree angle to provide a suitable position for anchoring the anchor device 10 in place in the sand 32. FIGS. 10 and 11 further illustrate the clamping of the post 21 to the first edge 24c of the bracket 24 to secure the anchor device 10 in an anchor position.

With a hole 42 in the sand 32 dug and the anchor device 10 in an anchor position, as seen in FIG. 10, it is inserted into the open hole 42 and then covered with beach sand 32 up to a sand line 31, thereby leaving a portion of the post 21 exposed above the sand surface 32a. With the anchor device 10 buried in the sand 32 with its base 23 secured and locked at a 90-degree angle relative to the post 21, the weight and volume of the sand 32 bears on the top surface 23a of the base 23, as indicated by arrow 38, to secure the anchor device 10 in place underneath the sand 32. The lateral positioning of the base 23 improves anchoring into sand 32 to make the anchoring more secure. Moreover, the upward contour shape of the base 23, when secured to post 21 via tubular member and turnbuckle 25, the anchor device of the present invention further improving anchoring. Even when wind velocity increases, the anchor device 10 of the present invention remains firmly in place.

FIG. 12 thereby shows how the anchor device 10 provides the post 21, which is substantially tubular with a top open end 21a, in a vertical position, in preparation for receipt of the pole 2 of an umbrella therein. A pole 2 of a beach umbrella 28 is inserted into a top open end 21a of tubular post 21. As can be understood, the umbrella pole 2 is routed downwardly into the tubular post 21 and then secured in place with thumb set screw 22, the use such set screws being well known in the art. Other structures for securing the umbrella pole 2 within the tubular post 21 may be employed. Preferably, an umbrella with a pole 2 having a maximum of 1.4 inches in diameter can be accommodated by the anchor device 10 but it should be understood that the anchor device 10 of the present invention can be sized larger or smaller, as required, to accommodate different sized umbrella poles 2.

Figure 13:
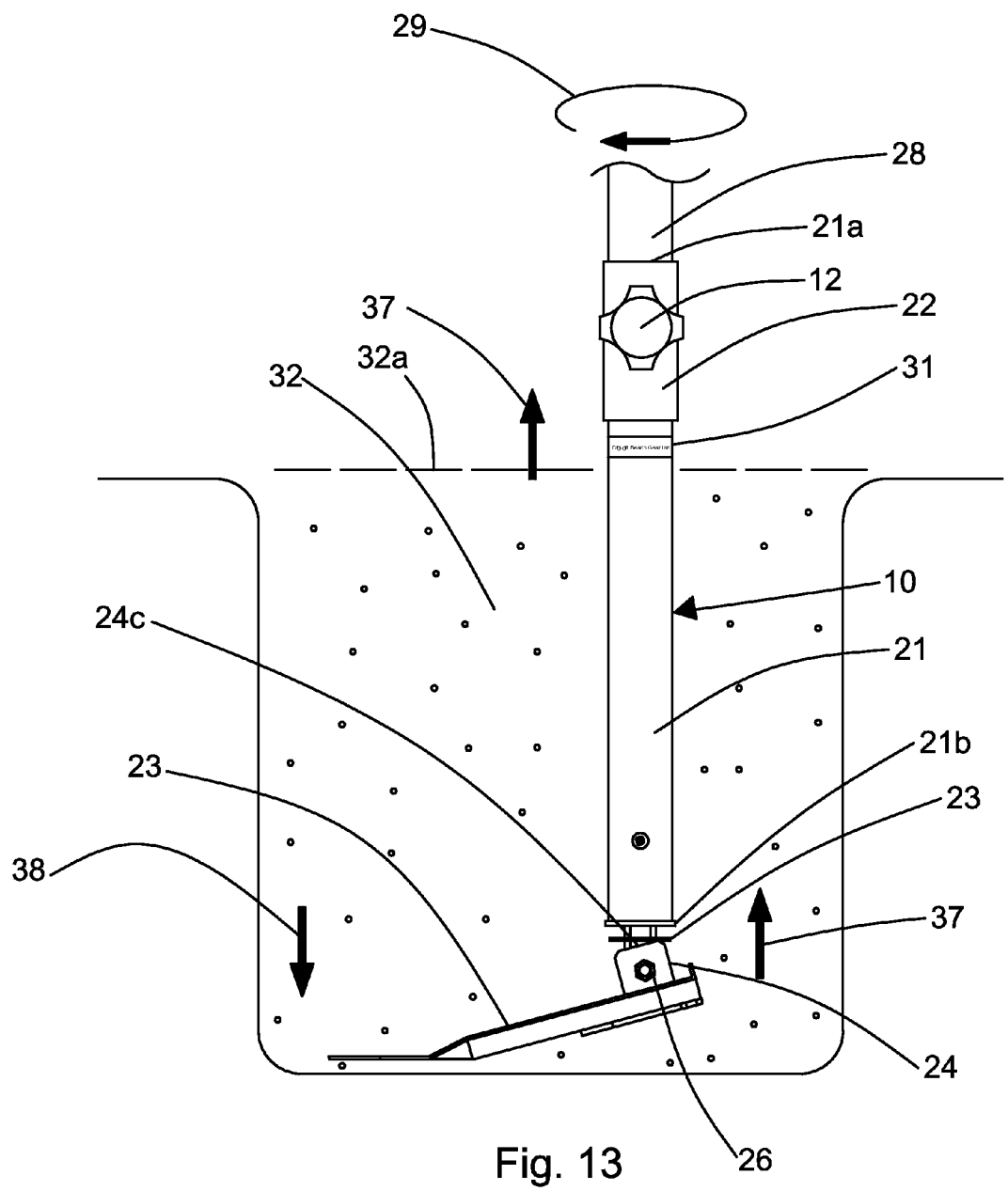
FIG. 13 is a partial side cross-sectional view of the anchor device in the position of FIG. 6 with base loosely connected to the post to facilitate removal of the anchor device from the sand-filled hole without removing the sand.

FIG. 13 shows the unique removal of the anchor device 10 from the sand 32 without first digging it out of the hole 32 into which it was installed. Preferably, the umbrella (and pole 2) is first removed from engagement with the post 21 by loosening the set screw 12 and separating the pole 2 of the umbrella from the post 21. Then, while the anchor device 10 is still buried in the sand 32, the portion of the post that is located above the surface 32a of the sand 32 (the portion of the post 21 above sand line 31) can be freely manipulated by the user. The post 21 is rotated counterclockwise so that the post 21 threadably loosens so the bottom edge 21b of the post 21 lifts off the first edge 24c of the bracket 24. The post 21 is rotated enough so that the base 23 can freely pivot relative to the post 21 about pin 26. For example, counterclockwise rotation of two full turns may be carried out to sufficiently loosen the post 21 from bracket 24 to permit the desired free pivoting.

While the anchor device 10 is still buried but now in a loosened position, as in FIG. 13, post 21 is grasped with both hands of the user and gently pulled upright to allow the base 23 to gently pivot toward a general vertically aligned loose shovel position of FIG. 4, which will allow the sand 32 to re-distribute its weight, thus allowing the anchor device 10 to be dislodged therefrom. Thus, the disengagement of the base 23 from the post 21 of the anchor device 10, even when buried, is possible by the present invention thereby obviating the need to dig out the anchor device 10 before removal.

Figure 14:
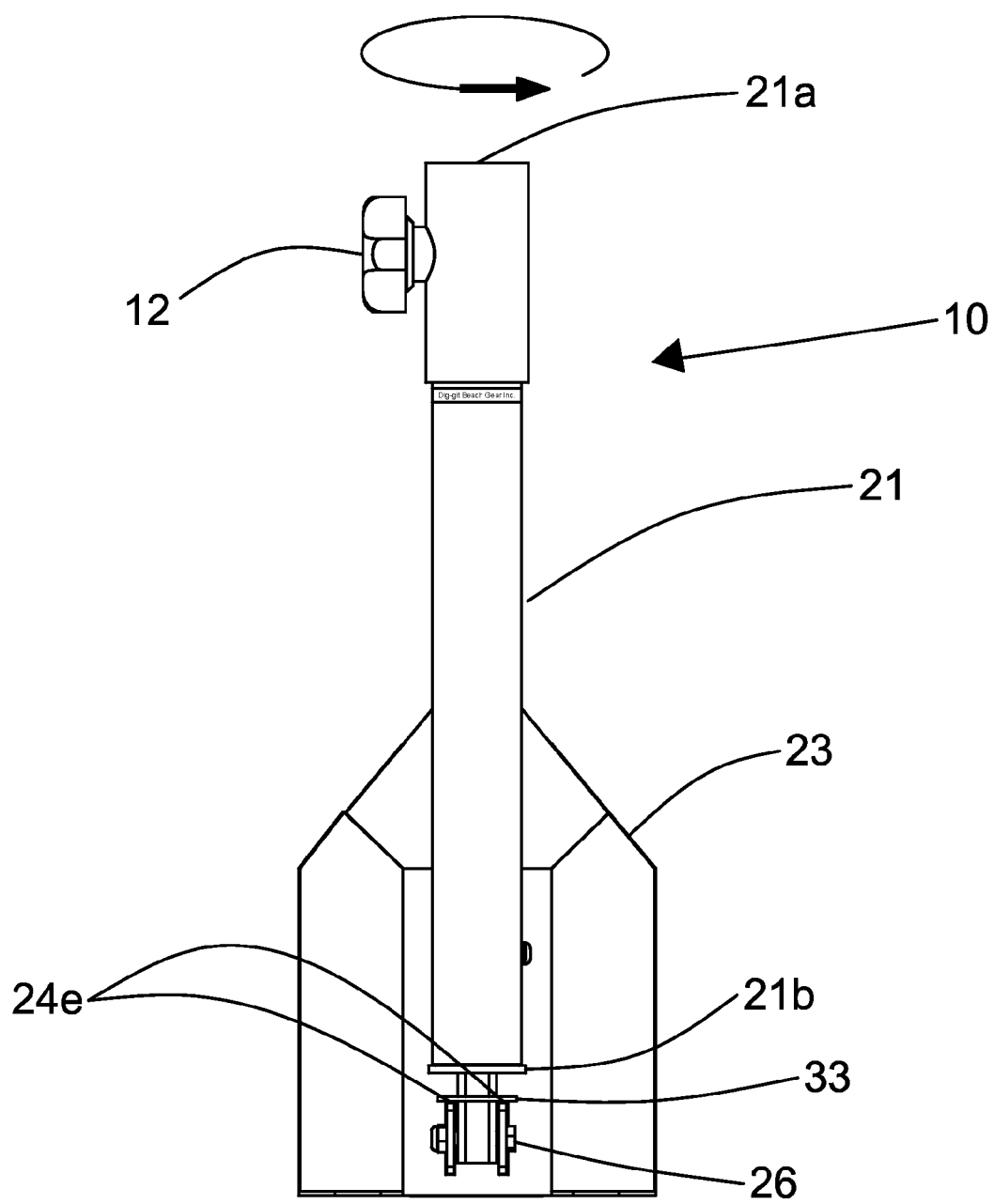
FIG. 14 is a top view of the anchor device of FIG. 1 in a storage position with the base loosely connected to the post.
Figure 15:
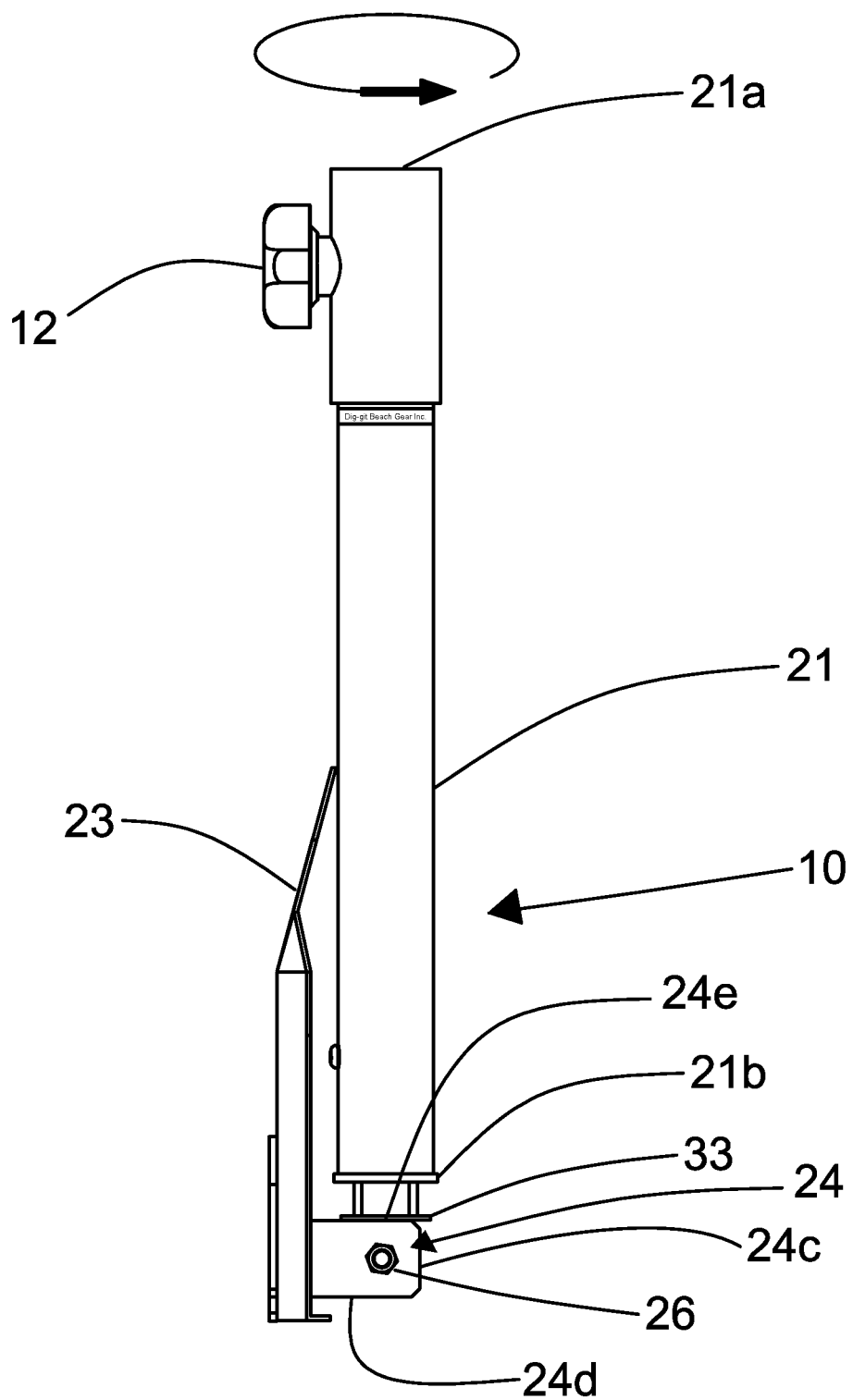
FIG. 15 is a side view of the anchor device of FIG. 14.
Figure 16:
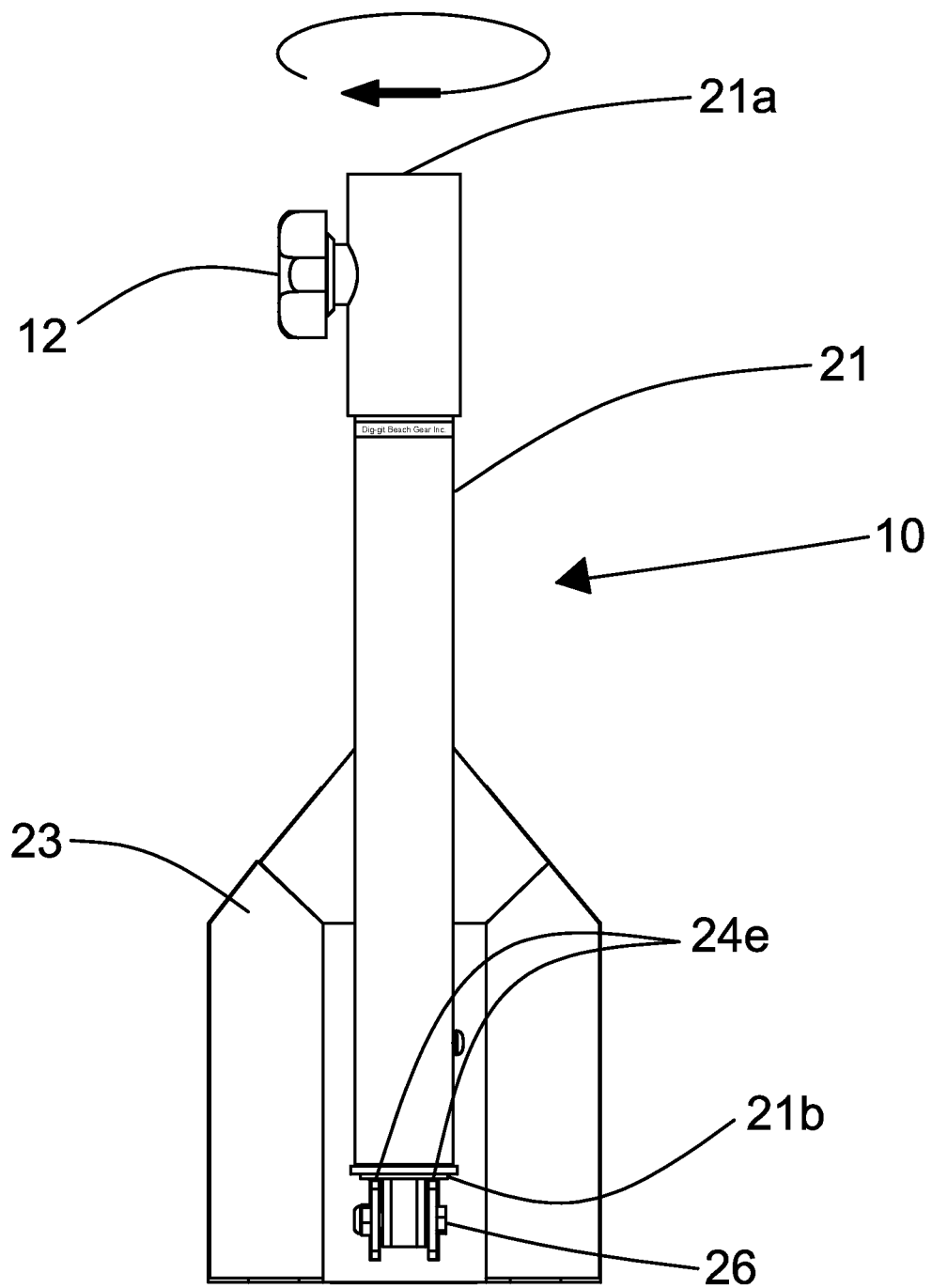
FIG. 16 is a top view of the anchor device of FIG. 1 is a storage position with the base tightly connected to the post.
Figure 17:
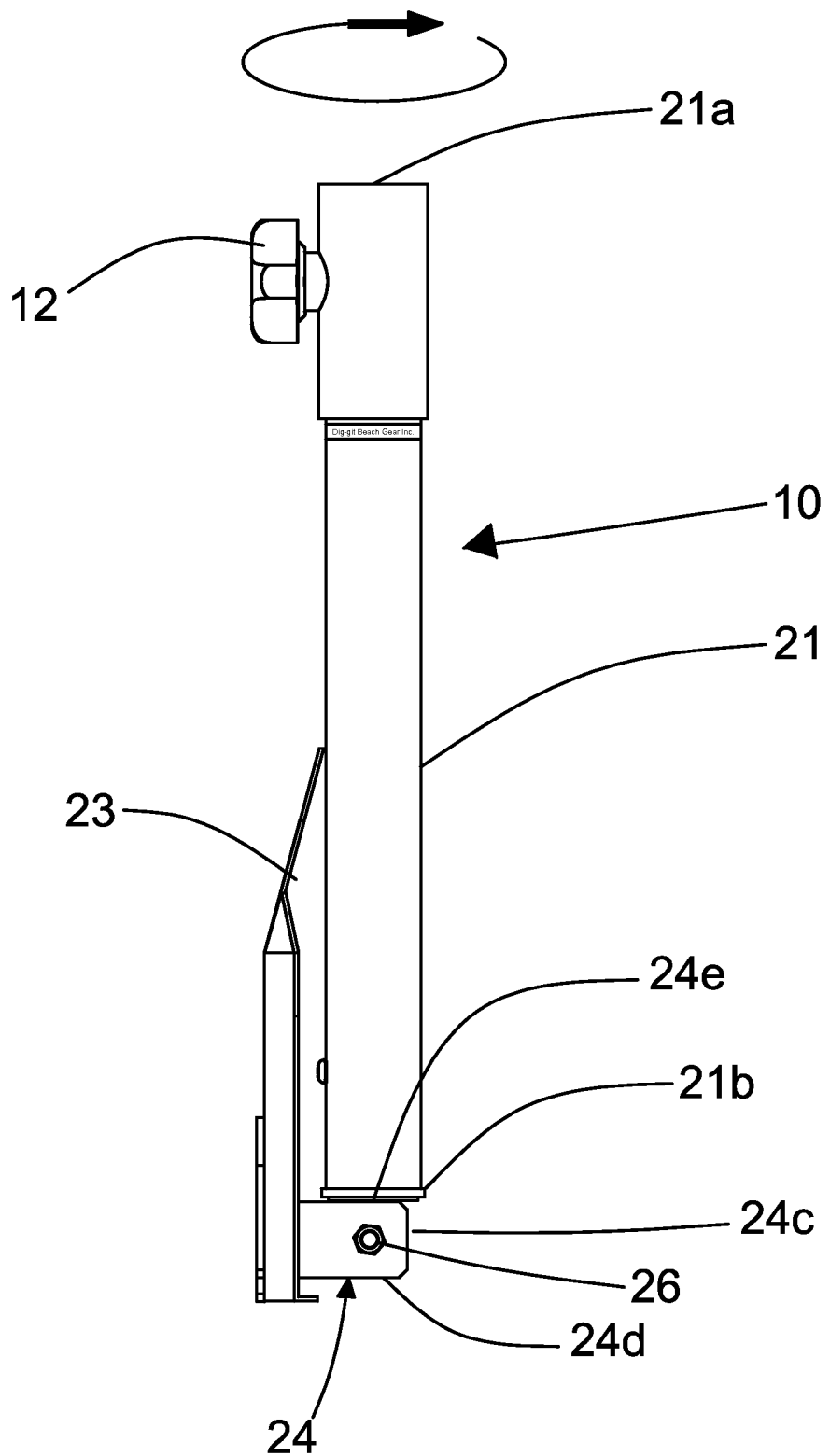
FIG. 17 is a side view of the anchor device of FIG. 16.

Once the anchor device 10 is removed, it is in the position of FIG. 4. For transport and storage it can be left as is in a loose position, tightened in place to a shovel position or even tightened in place to an anchor position. As seen in FIGS. 14-17, the anchor device 10 can be further configured into a compact storage and transport position. With the post 21 loosely pivotally connected to the bracket 24, the post 21 is pivoted 180 degrees so that the bottom surface 21b of the post 21 is substantially aligned with a third edge 24e of the bracket 24 which is substantially perpendicular to the top surface 23a of the base 23, similar to the second surface 24d on the bracket 24, but on an opposite side of the bracket 24. FIGS. 14 and 15 show the post 21 loosely located in this position. FIGS. 16 and 17 show the counterclockwise threaded rotation of the post 21 relative to the bracket 24 to secure the base 23 to the post 21 in a substantially folded position. This folding configures the anchor device 10 into a compact position to facilitate transport, point of sale display, shipping and the like.

The present invention is preferably made of metal materials for durability and strength but any suitable material can be used, such as reinforced plastics.

It would be appreciated by those skilled in the art that various changes and modifications can be made to the illustrated embodiments without departing from the spirit of the present invention. All such modifications and changes are intended to be covered by the appended claims.

What is claimed is:

1. An anchor device for supporting an umbrella in sand, comprising:
   a post member having a bottom edge and a top edge;
   a base member having an outer edge and a top surface;
   a bracket member affixed to the base member proximal to the outer edge; the bracket member including a first edge substantially parallel to the top surface and a second edge substantially perpendicular to the top surface of the base member;
   the post member pivotally connected to the bracket defining a turnbuckle assembly; the base member and the post member being movable between a shovel position with the bottom edge of the post in secured communication with the second edge, and a anchor position with the bottom edge of the post in secured communication with the first edge; the entire post being rotatable relative to the bracket member to effectuate locking and unlocking of the post to the base in the shovel position and to effectuate locking and unlocking of the post to the base in the anchor position, whereby the entire post operates the turnbuckle assembly and enables movement of device between the shovel position and the anchor position; the base member being fully buriable and the post member being partially buriable in sand when in the locked anchor position; when buried in the sand in a locked anchor position, the post member is configured and arranged to be unlocked with the bottom edge of the post member being separated from the first edge of the bracket to permit free rotation of the entire post relative to the bracket to facilitate pulling of the anchor device from sand without first digging it out from the sand.

2. The anchor device of claim 1, wherein the base member has an upwardly facing concave shape when in the anchor position.

3. The anchor device of claim 1, wherein the base member and post member are at substantially 90 degrees relative to one another when in the anchor position.

4. The anchor device of claim 1,
   wherein the turnbuckle assembly includes a main body member with a male threaded post on a first end and a pivot member on a second end; the male threaded post being threadably received in a female threaded aperture in the bottom of the post and the pivot member being pivotally connected to the bracket; the turnbuckle assembly being threadably rotatable in the bottom of the post, wherein the entire post is rotatable to operate the turnbuckle to draw the bottom edge of the post into and out of locking communication with either the first edge or the second edge of the bracket.

5. The anchor device of claim 4, further comprising:
   a washer disposed about the turnbuckle and located between the bottom edge of the post and the bracket.

6. The anchor device of claim 4, wherein the bracket has two upstanding walls, having respective apertures, configured and arranged to receive the pivot member on the second end of the turnbuckle assembly therein; the second end of the turnbuckle including a lateral pass through aperture; a pivot pin located through the respective apertures in the two upstanding walls and the lateral pass through aperture of the second end of the turnbuckle.

7. The anchor device of claim 1, wherein the post includes a recess in the top edge thereof configured and arranged for receipt of a pole of an umbrella therein.

8. The anchor device of claim 7, further comprising a set screw disposed through a female threaded aperture in the post proximal to the top edge thereof to secure the pole of an umbrella in place.

* * * * *